(12) United States Patent
Reber

(10) Patent No.: US 9,614,904 B2
(45) Date of Patent: *Apr. 4, 2017

(54) CLOUD PROCESSING SYSTEM AND METHOD FOR SYNTHESIZING OBJECTS BASED ON VEHICLE AGGREGATION LOCATION

(71) Applicant: William Reber, LLC, Tustin, CA (US)

(72) Inventor: William L. Reber, Tustin, CA (US)

(73) Assignee: William Reber, LLC, Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,089

(22) Filed: Mar. 16, 2016

(65) Prior Publication Data

US 2016/0197983 A1    Jul. 7, 2016

Related U.S. Application Data

(63) Continuation of application No. 14/834,209, filed on Aug. 24, 2015, which is a continuation of application
(Continued)

(51) Int. Cl.
*H04L 29/08* (2006.01)
*G05B 19/4099* (2006.01)
(Continued)

(52) U.S. Cl.
CPC ............... *H04L 67/10* (2013.01); *A61J 3/00* (2013.01); *B29C 67/0088* (2013.01); *B33Y 50/02* (2014.12); *G05B 15/02* (2013.01); *G05B 19/18* (2013.01); *G05B 19/4099* (2013.01); *G06F 1/3203* (2013.01); *G06F 9/5094* (2013.01); *G06Q 20/22* (2013.01); *H04L 67/12* (2013.01); *H04W 4/008* (2013.01); *G05B 2219/49023* (2013.01); *Y02B 60/1267* (2013.01); *Y02B 60/142* (2013.01)

(58) Field of Classification Search
None
See application file for complete search history.

(56) References Cited

U.S. PATENT DOCUMENTS

2004/0207662 A1* 10/2004 Anderson ............... G06T 17/20
715/772
2011/0212501 A1* 9/2011 Yoo ......................... A61L 27/54
435/174
(Continued)

OTHER PUBLICATIONS

Gordon 'Rapid prototyping for the masses', Machine Design, pp. 40-42, Jun. 9, 2011.*

*Primary Examiner* — Mohammad Ali
*Assistant Examiner* — Bernard G Lindsay
(74) *Attorney, Agent, or Firm* — Garlick & Markison; Bruce E. Stuckman

(57) ABSTRACT

A cloud computing system includes a network interface for interfacing with a wide area network. At least one wireless transceiver engages in bidirectional communication with a plurality of vehicle cloud processing devices within a corresponding plurality of vehicles in at least one vehicle aggregation location. A network control device receives requests for at least one cloud computing service via the wide area network and facilitates the at least one cloud computing service via the bidirectional communication with the plurality of vehicle cloud processing devices.

20 Claims, 14 Drawing Sheets

Related U.S. Application Data

No. 13/466,547, filed on May 8, 2012, now Pat. No. 9,146,603.

(51) Int. Cl.
| | |
|---|---|
| *G06F 1/32* | (2006.01) |
| *G06F 9/50* | (2006.01) |
| *B33Y 50/02* | (2015.01) |
| *G05B 15/02* | (2006.01) |
| *B29C 67/00* | (2017.01) |
| *G05B 19/18* | (2006.01) |
| *H04W 4/00* | (2009.01) |
| *A61J 3/00* | (2006.01) |
| *G06Q 20/22* | (2012.01) |

(56) References Cited

U.S. PATENT DOCUMENTS

| | | | |
|---|---|---|---|
| 2012/0143197 A1* | 6/2012 | Lang | A61B 5/4528 606/87 |
| 2012/0323690 A1* | 12/2012 | Michael | G06Q 30/02 705/14.58 |
| 2013/0085968 A1* | 4/2013 | Schultz | G06F 21/32 705/400 |
| 2013/0179056 A1* | 7/2013 | Fukuyama | G08G 1/0112 701/117 |
| 2016/0197982 A1* | 7/2016 | Reber | G06F 1/3203 358/1.15 |
| 2016/0285965 A1* | 9/2016 | Reber | G06F 1/3203 |

\* cited by examiner

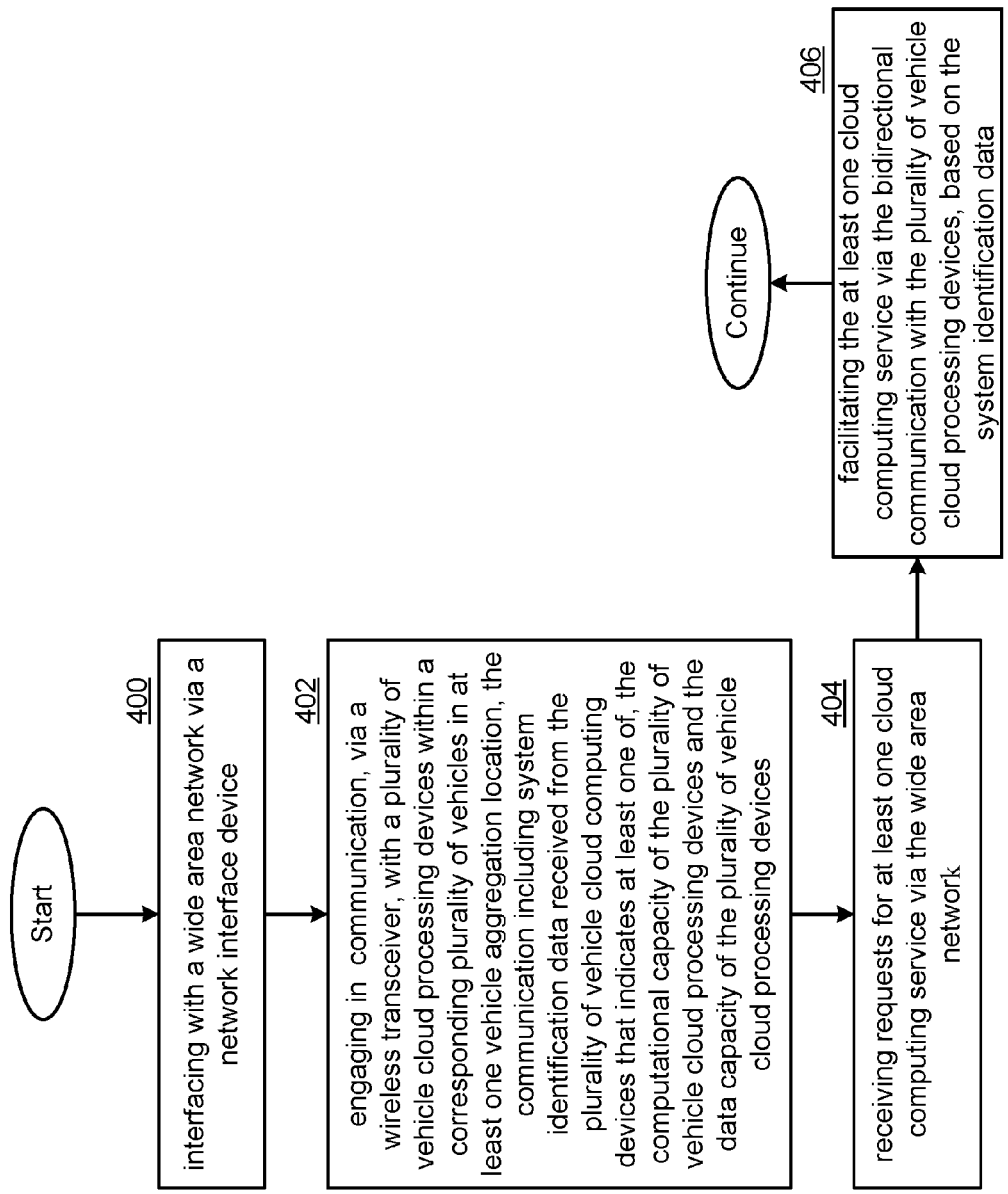

CLOUD PROCESSING SYSTEM AND METHOD FOR SYNTHESIZING OBJECTS BASED ON VEHICLE AGGREGATION LOCATION

CROSS REFERENCE TO RELATED PATENTS

The present U.S. Utility Patent Application claims priority pursuant to 35 U.S.C. §120 as a continuation of U.S. Utility application Ser. No. 14/834,209, entitled "CLOUD COMPUTING SYSTEM, VEHICLE CLOUD PROCESSING DEVICE AND METHODS FOR USE THEREWITH", filed Aug. 24, 2015, which is a continuation of U.S. Utility application Ser. No. 13/466,547, entitled "CLOUD COMPUTING SYSTEM, VEHICLE CLOUD PROCESSING DEVICE AND METHODS FOR USE THEREWITH", filed May 8, 2012, issued as U.S. Pat. No. 9,146,603 on Sep. 29, 2015, both of which are hereby incorporated herein by reference in their entirety and made part of the present U.S. Utility Patent Application for all purposes.

TECHNICAL FIELD OF THE INVENTION

The present invention relates to cloud computing systems and methods for performing cloud computing services using a computer network.

DESCRIPTION OF RELATED ART

The popularity of video and gaming applications and other computationally intensive applications have increased the data requirements for home users. Users have begun to expect mobile devices to perform a wider variety of tasks, in spite of the desire for mobile devices to be small and portable. Computation tasks associated with digital data sources from commercial entities are growing also rapidly. Examples of such commercial entities include both online and brick and mortar entities such as businesses, educational institutions, research and science organizations, healthcare providers, entertainment companies, governmental organizations and other entities. While the computational requirements of such commercial entities may offer breakthrough discoveries and innovations, and new and more attractive products and services, these requirements frequently come at the cost of significant increases in associated energy consumption, carbon footprint and costs.

The amount of electricity used by servers and other Internet infrastructure has become an important issue in recent years as demands for new Internet services such as music downloads, video-on-demand, and Internet telephony, have become more widespread. Aggregate electricity use for servers doubled over the period 2000 to 2005 both in the U.S. and worldwide. Total power used by servers represented about 0.6% of total U.S. electricity consumption in 2005. The total power demand in 2005 including associated infrastructure is equivalent in capacity terms to about five 1000 MW power plants for the U.S. and 14 such plants for the world. The total electricity bill for operating those servers and associated infrastructure in 2005 was about $2.7 B and $7.2 B for the U.S. and the world, respectively. Electricity used in global data centers in 2010 likely accounted for between 1.1% and 1.5% of total electricity use, respectively. For the US that number was between 1.7 and 2.2%. There is a need for providing new computing and data processing resources for information services that are capable of performing computationally intensive tasks while effectively reducing the associated energy requirements and overall carbon footprint Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 20 presents a flowchart representation of a method in accordance with an embodiment of the present invention.

DETAILED DESCRIPTION OF THE INVENTION INCLUDING THE PRESENTLY PREFERRED EMBODIMENTS

Figure 1:
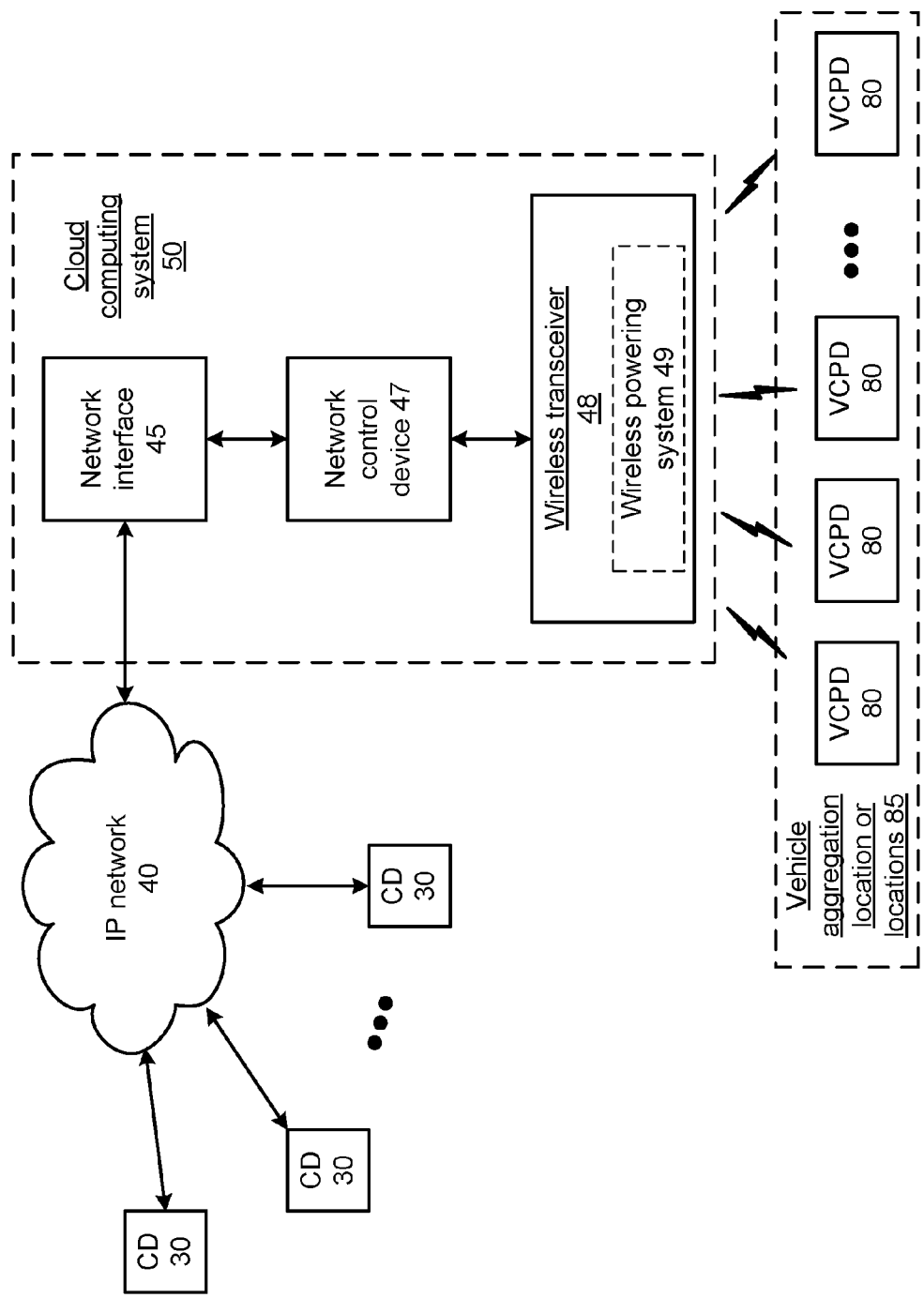
FIG. 1 presents a block diagram representation of a cloud computing system 50 in accordance with an embodiment of the present invention.

FIG. 1 presents a block diagram representation of a cloud computing system 50 in accordance with an embodiment of the present invention. In particular a cloud computing system 50 includes a network interface 45 for interfacing with a wide area network such as an internet protocol (IP) network 40 or other wide area network. One or more wireless transceivers 48 engage in bidirectional communication with a plurality of vehicle cloud processing devices 80 within a corresponding plurality of vehicles in at least one vehicle aggregation location 85. The vehicle aggregation location or locations 85 can be parking lots, parking garages and other parking facilities and structures, and can also include other parking locations such as street parking locations and driveway parking locations associated with a geographic area—a neighborhood, community or other place where vehicles congregate.

A network control device 47 receives requests for cloud computing services from users of client devices 30 via the IP network 40 and facilitates the cloud computing service via the bidirectional communication with the plurality of vehicle cloud processing devices 80. In particular, the network control device 47 utilizes the computing resources of the vehicle cloud processing devices 80 to create a cloud computing environment that fulfills the requests for cloud computing services.

The client devices can include wireless or wireline communication devices such as mobile telephones, mobile data devices, tablet computing systems, digital books, cameras, game devices such as video games, internet televisions, set top boxes, digital video recorders and other cloud computing clients devices. The users of such client devices 30 can include personal users, sports and entertainment organizations, users of cloud computing centers, data centers, business computing centers, academic and research computing centers, vehicle associated users and other users of client devices 30. In an embodiment of the present invention each client device 30 includes a processing element and memory that stores a cloud computing client application that is executed by the processing element to generate requests for cloud computing services and to receive the cloud computing services in response thereto. In addition, the client device 30 includes a network interface for communicating with the IP network 40 on a wired or wireless basis.

In operation, the cloud computing system 50 utilizes the function of parking facilities or other vehicle aggregation locations 85 to aggregate a large number of vehicles that are equipped with vehicle cloud processing devices 80 to provide cloud computing services. This harnesses the potential associated with parked vehicles. In particular, vehicles are parked approximately 95% of the time, over time (i.e. minutes, hours, days) on a repetitive basis throughout the year in one or more geographic locations (i.e. locations associated with businesses, including existing data centers, academic organizations, entertainment locations including stadiums, and theme parks, hospitals, government organizations, transportation facilities such as airports, and train stations, and city centers) and within one or more time zones. The cloud computing system 50 makes use of vehicles having vehicle cloud processing devices 80, such as cloud processing devices such as either commercial off-the-shelf equipment or integrated vehicle systems having a wireless transceiver that is capable of communicating with wireless transceiver 48 and further having high performance computing and storage devices that can perform computational tasks assigned by network control device 47 as part of a cloud computing environment. In this fashion, the cloud computing system 50 can fulfill requests for cloud computing services such as public cloud services, private cloud services, community cloud services, hybrid cloud services, internal cloud services, software as a service (SaaS), platform as a service (PaaS), and infrastructure as a service (IaaS) and other cloud services via the IP network 40.

While the vehicle cloud processing devices may be powered via either their own power sources or via the electrical system of the vehicle in which they are associated, as shown, the wireless transceiver 48 can include a wireless powering system 49 that emits electromagnetic energy that is harvested by a power system of one or more of the vehicle cloud processing devices to power these vehicle cloud processing devices 80. While the wireless powering system 49 is shown as part of the wireless transceiver and may operate via one or more radio frequency (RF) carriers of the wireless transceiver 48, the wireless powering system 49 can be a separate system that operates via either short-field or long field electromagnetic (including magnetic) emissions to provide power to one or more of the vehicle cloud processing devices 80.

The particular vehicle cloud processing devices 80 incorporated in to a cloud computing environment of cloud computing system 50 can be continually in flux, based on the particular vehicles parked at the vehicle aggregation location or locations 85 at any point in time. In a further example of operation, the network control device 47 associates vehicle cloud processing devices 80 with the cloud computing system 50 when the vehicles that carry the vehicle cloud processing devices 80 enter the vehicle aggregation location or locations 85 and further operates to disassociate vehicle cloud processing devices 80 after the their corresponding vehicles leave the vehicle aggregation location or locations 85.

For example, the association of any particular vehicle cloud processing device 80 with the cloud computing system 50 can include the receipt by the network control device 47 via the wireless transceiver 48 of system identification data from the vehicle cloud processing device 80 that identifies system parameters of the vehicle cloud processing device 80 such as the processing power, data capacity, wireless bit rate, battery capacity, powering mode, resident applications and other system parameters associated with the corresponding ones of the plurality of vehicle cloud processing devices. In response, the network control device 47 facilitates cloud computing service based on the system identification data, for example by allocating computational tasks associated with requests for cloud computing services based on the capabilities and possible restrictions of such individual computing device that forms the cloud. In an embodiment of the present invention, the wireless transceiver of a vehicle cloud processing device 80 is paired with the wireless transceiver 48 via a pairing procedure, such as a Zigbee pairing procedure, Bluetooth pairing procedure, an 802.11 compliant access point/station association or other pairing procedure, under control of the user of the vehicle associated with the particular vehicle cloud processing device 80. After the wireless transceivers are paired the first time, the vehicle cloud processing device 80 can be automatically associated with the cloud computing system 50 upon subsequent visits by the vehicle to that vehicle aggregation location.

In general, the network control device 47 receives requests for cloud computing services, segments these requests into discrete computational tasks and allocates these tasks to be performed by the various vehicle cloud processing devices 80. The network control device 47 also monitors the performance of these tasks by the vehicle cloud processing devices 80, collects the results and provides the completed services back to the requesting client device 30 via the IP network 40. In an embodiment of the present invention, the network control device 47 manages the vehicle cloud processing devices to complete the tasks, reassigns uncompleted tasks to other vehicle cloud processing devices 47, and optionally assigns the same task to two or more vehicle cloud processing devices for the purposes of fault tolerance in the event of failure or redundancy in the event that the vehicle that contains the vehicle cloud processing device 80 disassociates with the cloud computing system 50 before the task has been completed.

After a particular vehicle cloud processing device 80 is associated with the cloud computing system 50, the network control device 47 allocates particular computational tasks associated with requests for cloud computing services to the vehicle cloud processing device 80. When a computational task is allocated to a vehicle cloud processing device 80, data is sent from the network control device 47 that identifies the task, provides input data, and further includes other control information associated with the performance of the task, such as a task identifier, time constraints, and other information.

As discussed above, the allocation of computational tasks to the vehicle cloud processing device 80 can be based on the computational power, memory space, link data rate, available battery power, etc. of the device. In circumstances where a computational task is allocated to the vehicle cloud processing device 80 that involves the execution of an application that is not resident to or otherwise loaded on the vehicle cloud processing device 80, the network control device 47 transfers the application in the form of software or other operational instructions to be executed by the vehicle cloud processing system 80.

In response to the execution of the task, the vehicle cloud processing device 80 generally transmits output data back to the network control device 47, however, in some circumstances, such as an embodiment that will be described in further detail in conjunction with FIG. 9 where the vehicle cloud processing device includes a synthesis device for producing an object, article or other tangible result at the vehicle, the vehicle cloud processing device 80 sends data to the network control device 47 that indicates that the allotted task has been completed.

In addition to the network control device 47 collecting system identification data, the network control device 47 can also allocate computational tasks to the vehicle cloud processing devices 80 based on the estimated time that a vehicle will be parked at the vehicle aggregation location or locations 85. This estimated time can be generated by the user of the vehicle via direct input into the vehicle cloud processing system 80, via interaction with a parking meter associated with the parking space for the vehicle to reserve a certain amount of parking time, based on a model of the vehicle aggregation location or locations 85, as either a retail location, overnight parking location, event venue, a workplace, an airport or other long term parking facility. In a further embodiment, the amount of time remaining can be estimated on a vehicle by vehicle basis via a probability distribution such as an exponential probability distribution or other probability density function.

In one implementation, vehicles users are offered some form of compensation in exchange for the use of the vehicle cloud processing device 80 in conjunction with the cloud computing system 50. The compensation can be in the form of free parking, parking at a discounted rate, access to premium parking spots, the accumulation of points redeemable with merchants or service providers, cash back bonus offers, coupons, or other benefits, both monetary and non-monetary.

Further details regarding the operation of cloud computing system 50 and vehicle cloud processing device 80 including several optional functions and features will be described in further detail in conjunction with FIGS. 2-20 that follow.

Figure 2:
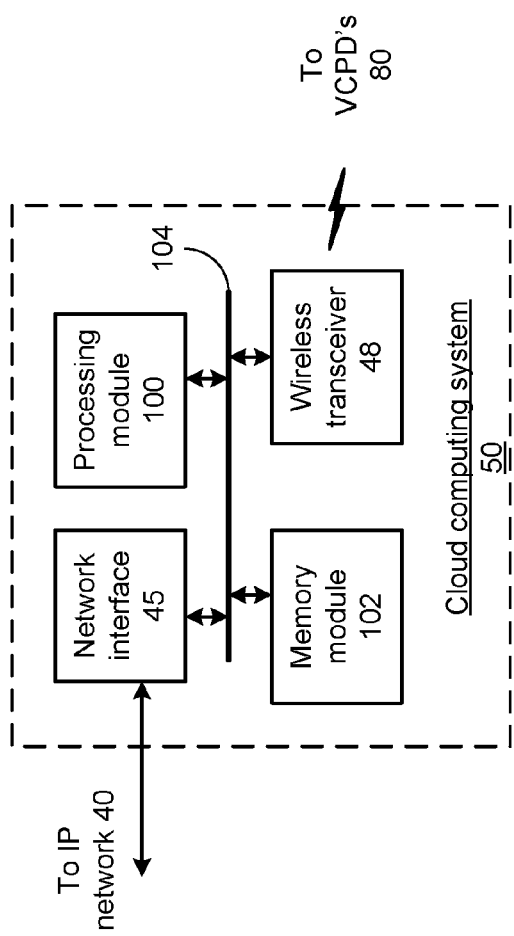
FIG. 2 presents a block diagram representation of a cloud computing system 50 in accordance with an embodiment of the present invention.

FIG. 2 presents a block diagram representation of a cloud computing system 50 in accordance with an embodiment of the present invention. In particular, cloud computing system 50 includes a network interface 45, a processing module 100, a memory module 102 and wireless transceiver 48 that are coupled via a bus 104. In this particular embodiment the network control device 47 is implemented via processing module 100 configured by operational instructions stored in memory module 102.

The wireless transceiver 48 can include a wireless local area network transceiver such as a 802.11 compliant access point transceiver, a Bluetooth transceiver, a Zigbee transceiver, a Wimax transceiver, a 3G, 4G base station or other wireless telephony transceiver, a RF identification (RFID) transceiver or other transceiver that communicates with a complementary transceiver of the vehicle cloud processing device 80. The network interface 45 can include a network card that couples to a wired Internet connection or other wired network connection via an Ethernet, Firewire or other wired interface, a wireless modem, wireless telephony transceiver or other interface to IP network 40.

The processing module 100 can be implemented using a single processing device or a plurality of processing devices. Such a processing device may be a microprocessor, co-processors, a micro-controller, digital signal processor, graphics processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 102. Memory module 102 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 100 and memory module 102 are coupled, via bus 104, to the network interface 45 and the wireless transceiver 48. The network interface 45 and the wireless transceiver 48 each operate in conjunction with the processing module 100 and memory module 102. While a particular bus architecture is shown, alternative architectures using direct connectivity between one or more modules and/or additional busses can likewise be implemented in accordance with the present invention. It should be noted that cloud computing system 50 can include other wired or wireless connection to additional processing facilities, such as fixed processing facilities or temporary processing facilities that operate in conjunction with the vehicle cloud processing devices 80 to form a cloud computing environment. In particular, these additional processing facilities can supplement the computational processing resources of the vehicle cloud processing devices 80.

Figure 3:
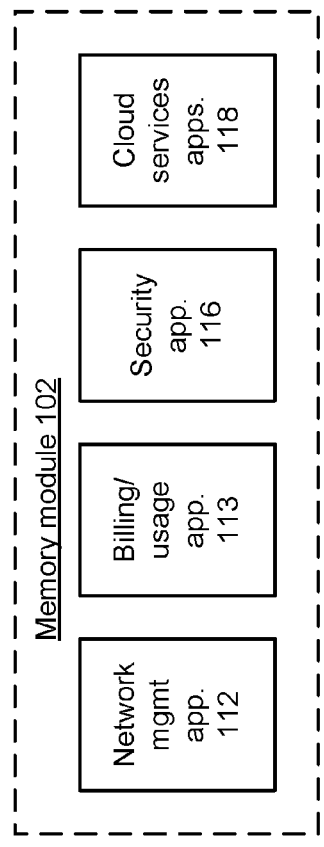
FIG. 3 presents a block diagram representation of a memory module 102 in accordance with an embodiment of the present invention.

FIG. 3 presents a block diagram representation of a memory module 102 in accordance with an embodiment of the present invention. In particular, memory module 102 stores a plurality of applications including a network management application 112 that configures the processing module 100 to perform the functions previously described in conjunction with the network control device 47, a billing usage application 113 that monitors the usage of cloud computing services requests by users of client devices 30 and that bills for these services on a per request basis, on the basis of time, on a subscription basis or other billing basis. In addition, billing usage application 113 optionally keeps track of credits or other compensation earned by the vehicle cloud processing devices 80 in conjunction with the specific tasks performed in conjunction with the cloud computing environment. Security application 116 secures the data exchanges with client devices 30 via IP network 40 and further via the cloud computing system 50 and the vehicle cloud processing devices 80. In addition, the security application 116 optionally scrambles the data provided to vehicle cloud processing devices 80 and descrambles the output data or otherwise manages the security of the data during processing by vehicle cloud processing devices 80 in order to protect the security of the data and prevent unauthorized access to the data during processing via the vehicle cloud processing devices 80. Cloud services applications 118 include a plurality of software modules that can be either executed by processing module 100 in conjunction with a particular cloud service (e.g. a software defines network application) or that can be downloaded to a vehicle cloud processing device 80 to be executed by the vehicle cloud processing device 80 in conjunction with a computational task allocated to that device by the network control device 47.

In addition to the specific applications shown, the memory module 102 can store other software and data including system data, user data, cache and buffer storage, an operating system, device drivers, utilities and other software and data.

Figure 4:
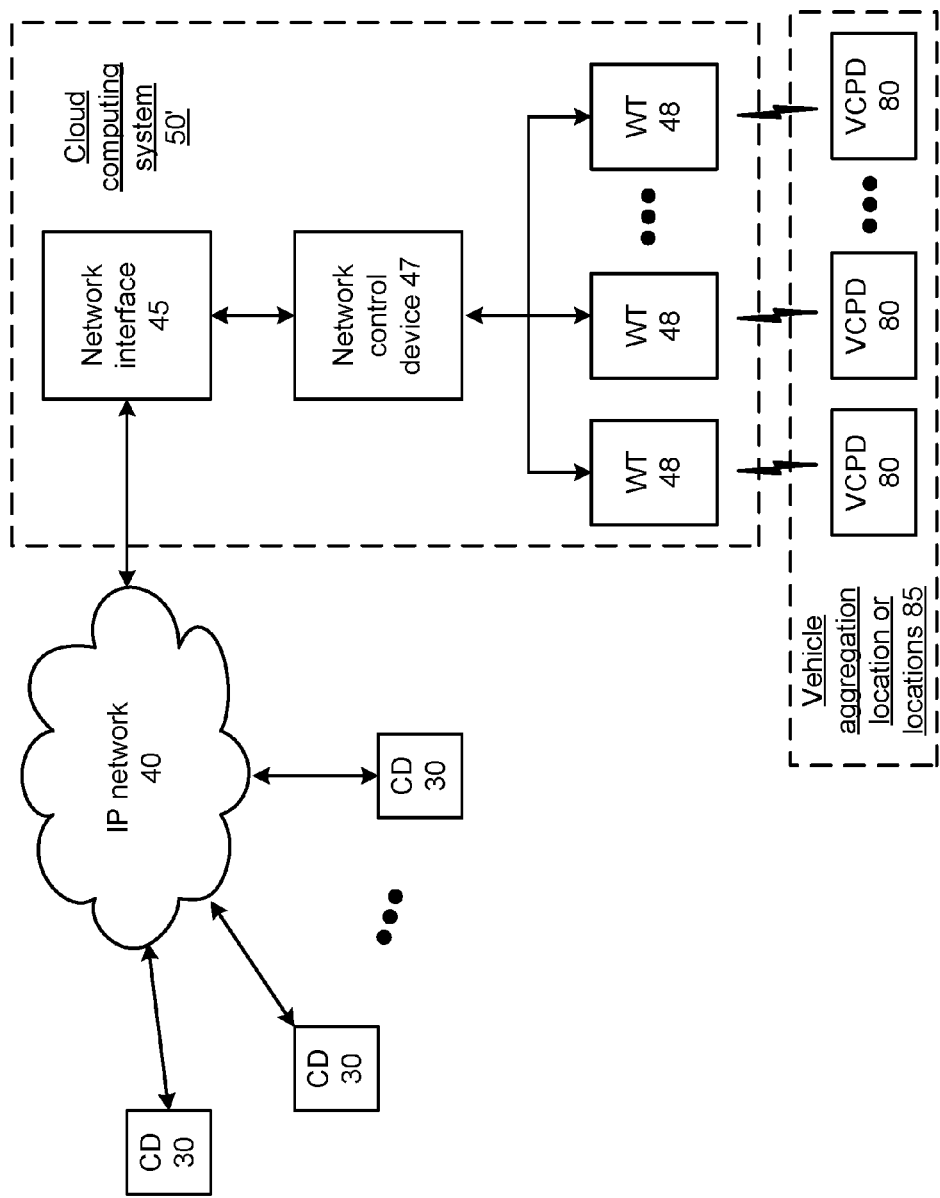
FIG. 4 presents a block diagram representation of a cloud computing system 50' in accordance with an embodiment of the present invention.

FIG. 4 presents a block diagram representation of a cloud computing system 50' in accordance with an embodiment of the present invention. In particular an embodiment is shown where the cloud computing system 50' operates in a similar fashion to cloud computing system 50, and includes similar elements that are referred to by similar reference numerals. In this embodiment, the cloud computing system 50' includes multiple wireless transceivers 48. These multiple wireless transceivers 48 can be distributed at different locations at a single vehicle aggregation location such as a large parking structure, parking lot, parking area or other vehicle aggregation location to cover a wider area. In one such embodiment, each wireless transceiver 48 is included in a parking meter associated with a single parking space for communication with a vehicle parking in that space. In other embodiments, a single wireless transceiver 48 communicates with multiple vehicles spanning multiple parking spaces of a vehicle aggregation location.

While described above in conjunction with a single vehicle aggregation location, the wireless transceivers 48 can be distributed over multiple vehicle aggregation locations in the same city, or in different cities, regions, different time zones and different continents around the globe. In this embodiment, the network control device 47 and the wireless transceivers 48 can each include a network interface to a wide area network, such as the Internet, other IP network or other backbone network to communicate with each other over longer distances.

In one mode of operation, the network control device 47 fulfills requests for cloud computing services by allocating computational tasks over a plurality of vehicle aggregation locations, based on the plurality of associated time zones. In particular, requests for cloud computing services that require a significant portion of a day or one or more days to fulfill can be segmented into computational tasks that are allocated to vehicle aggregation locations by the time of day in the those locations to correspond to times that the vehicle aggregation locations would be the highest capacity.

For example, in a scenario where the vehicle aggregation locations are associated with retail establishments, theme parks, or work locations, that are primarily populated with vehicles during the day, computational tasks can be allocated to these vehicle locations during these times, on a rolling basis throughout a 24 hour period so that tasks are assigned to vehicle cloud processing devices 80 at vehicle aggregation locations around the globe. The network control device 47 provides interconnection of vehicle cloud processing devices across the United States—a large geographic region and 4 time zones—or Europe or Asia or a global combination of geographic regions and time zones. In this fashion, a cloud computing service could begin with vehicle aggregation locations in Asia, continue later in the day with vehicle aggregation locations in Europe and Africa and continue on with vehicle aggregation locations in North and South America.

In a more general application, network control device 47 maintains a registry data associated with each of the vehicle aggregation locations that either categorizes each vehicle aggregation location as to expected occupancy by time of day and expected duration of vehicle parking or that provides statistical data that tracks the expected parking duration and time of day occupancy of these vehicle aggregation locations. In this fashion, overnight parking garages or lots associated with homes or apartments that are primarily populated by night can be designated not only based on location throughout the globe but also differently from vehicle aggregation locations associated with retail establishments, theme parks, or work locations, that are primarily populated with vehicles during the day. In addition, long term parking facilities can be categorized differently from medium or short term parking facilities.

In addition to the parameters discussed above, the registry data associated with the vehicle aggregation location can further include data that indicates whether the vehicle aggregation location is commercial or community, private or public, a specific identifier unique to the vehicle aggregation location, a further description of the vehicle aggregation location, a geographic location, a time zone, a maximum capacity, the number of and/or capacity of vehicle cloud processing devices that are currently available, a projection of future vehicle cloud processing device availability and pricing associated with the use of such a facility. In accordance with these embodiments, the network control device 47 can allocate computational tasks associated with requests for cloud computing services over the plurality of vehicle aggregation locations, based on the specific registry data associated with these locations. For example long duration tasks can either be allocated to vehicle aggregation locations with long term parking or segmented into shorter tasks that are allocated to medium term or short term parking locations. Computational tasks can first be allocated to vehicle aggregation locations with lower prices and higher priced facilities can be employed only when needed to meet the demands of current requests for cloud computing services.

Note that the scalability of interconnections of vehicle cloud processing devices 80 on a global basis offers the potential for large scale computational capabilities approaching millions of processors without the large associated power—these large scale configurations could be used for test beds for development of exascale computing to develop and test new algorithms, software, and networking technology, as well as a broad range of other cloud computing services.

Figure 5:
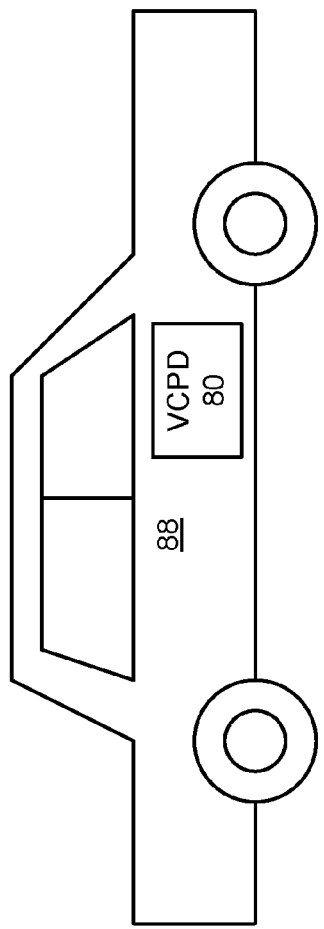
FIG. 5 presents a pictorial block diagram representation of a vehicle with a vehicle cloud processing device 80 in accordance with a further embodiment of the present invention.

FIG. 5 presents a pictorial block diagram representation of a vehicle with a vehicle cloud processing device 80 in accordance with a further embodiment of the present invention. In particular, a vehicle 88 is shown that includes a vehicle cloud processing device 80. In an embodiment of the present invention the vehicle cloud processing device 80 can be integrated into the systems of the vehicle 88 including the electrical system of the vehicle 88 to power the vehicle cloud processing device 80 and the display and/or other user interface elements of the vehicle 88, allowing the user of the vehicle 88 to interact with the vehicle cloud processing system 80. In this fashion, the user of the vehicle 88 can enter data into the vehicle could processing device 80 and optionally cloud processing system 50 to enable and disable the vehicle cloud processing device 80, to selectively pair with the cloud processing system 50 at a particular vehicle aggregation location, accept offers by the cloud computing system 50, to monitor usage and to monitor and redeem credits, coupons, receive discounts and to interact in other ways.

It should be noted, that any of the scenarios described herein a user of a vehicle could use a client device 30 such as a smartphone or other wireless communication device to directly interact with the vehicle cloud processing device 80 associated with the user's vehicle upon proper authentication or pairing between the client device 30 and the vehicle cloud processing device 80.

In another embodiment, the vehicle cloud processing device 80 is an aftermarket device that is mounted, installed or otherwise placed in the vehicle 88 by the user. Further details regarding the implementation of vehicle cloud processing device 80 including several optional functions and features will be discussed in conjunction with FIGS. 6-9.

Figure 6:
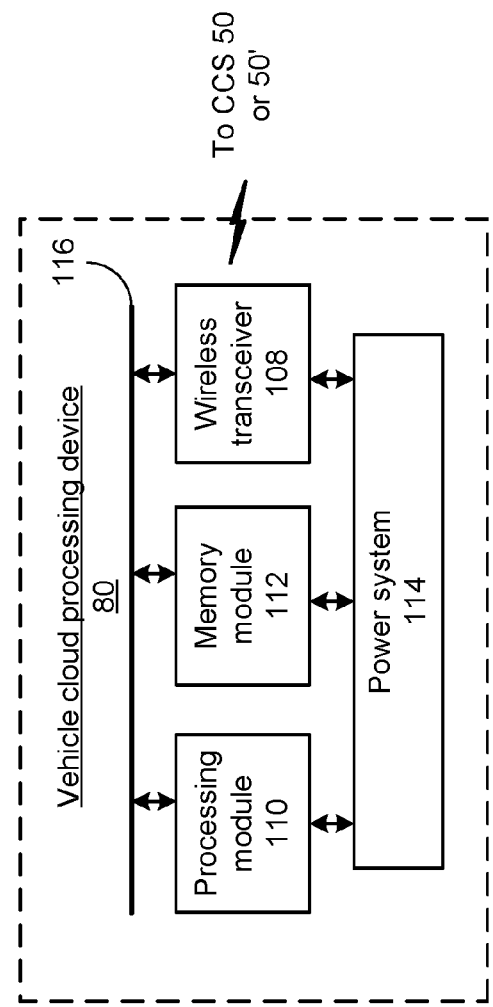
FIG. 6 presents a block diagram representation of vehicle cloud processing device 80 in accordance with a further embodiment of the present invention.

FIG. 6 presents a block diagram representation of vehicle cloud processing device 80 in accordance with a further embodiment of the present invention. In particular, a vehicle cloud processing device 80 is shown that includes a wireless transceiver 108, processing module 110 and memory module 112 that are powered via power system 114. While not specifically shown, the vehicle cloud processing device 80 can further include one or more user interface devices that are either shared with a vehicle, such as vehicle 88 or that are dedicated to the vehicle cloud processing device 80 and/or one or more other devices. While not specifically shown, the vehicle cloud processing device 80 can further include one or more other modules including a network communication device such as a wireless telephony transceiver or other wireless network interface for coupling to IP network 40, a location system such as a global positioning system (GPS) or other location system, and/or a security module that operates in conjunction with a security application of network control device 47 to maintain the security of the link to the cloud computing system 50 or 50' and further to maintain the security of the data processed in conjunction with one or more allocated computational tasks.

The wireless transceiver 108 is complementary to, and operates to communicate with, wireless transceiver 48 for engaging in bidirectional communication with a network control device 47 of cloud computing system 50 or 50' at a vehicle aggregation location.

The processing module 110 can be implemented using a single high performance processing device or a plurality of processing devices. Such a processing device may be a microprocessor, co-processors, a micro-controller, digital signal processor, graphics processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 112. Memory module 112 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 110 and memory module 112 are coupled, via bus 116, to the wireless transceiver 108. The wireless transceiver 108 operates in conjunction with the processing module 110 and memory module 112. While a particular bus architecture is shown, alternative architectures using direct connectivity between one or more modules and/or additional busses can likewise be implemented in accordance with the present invention.

In operation, the memory module 112 stores a vehicle cloud processing device application. A processor of processing module 110 executes the vehicle cloud processing device application to receive cloud computational tasks from the network control device 47 via the wireless transceiver 108, to generate cloud computational task results, based on the cloud computational task, and to provide cloud computational task results to the network control device 47 via the wireless transceiver.

The power system 114 can be coupled to a vehicle battery of the vehicle 88 to provide power to the modules of vehicle cloud processing device 80. In one configuration, the power system 114 includes a voltage regulator, diode, overvoltage protector or other device that operates exclusively via the vehicle battery to power the vehicle cloud processing system 80 even when the vehicle ignition is turned off. In another configuration, the power system 114 includes a battery and is coupled to a vehicle electrical system of the vehicle 88 to charge the battery of the power system 114 when the vehicle is in operation, and that is decoupled from a vehicle battery of the vehicle when the vehicle is not in operation, such as when the ignition of the vehicle 88 is turned off. In this fashion, as the vehicle 88 is being driven the battery of power system 114 is being charged. When the vehicle 88 is parked and the ignition system is turned off, the vehicle cloud processing device 80 is powered via the battery of power system 114.

In another configuration, the power system 114 includes its own battery that is decoupled from the vehicle battery. In this mode of operation, the battery of power system 114 can be charged via a solar cell, fuel cell, thermoelectric cell, piezoelectric device or other device that generates a charge in response to the motion of the vehicle 88, via coupling to a power source at the vehicle aggregation location or via other external source of power.

Figure 7:
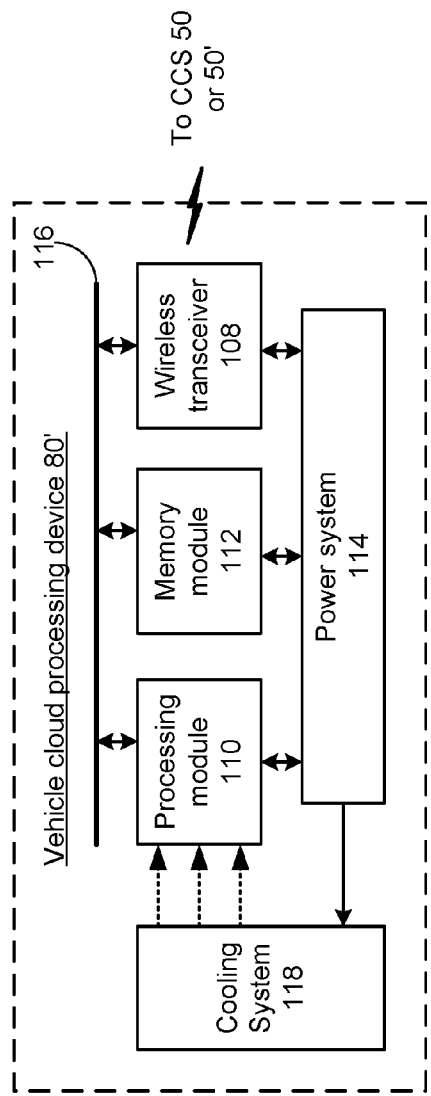
FIG. 7 presents a block diagram representation of vehicle cloud processing device 80' in accordance with a further embodiment of the present invention.

FIG. 7 presents a block diagram representation of vehicle cloud processing device 80' in accordance with a further embodiment of the present invention. In particular, an embodiment is shown where the vehicle cloud processing device 80' operates in a similar fashion to vehicle cloud processing device 80, and includes similar elements that are referred to by similar reference numerals. In this embodiment, the vehicle cloud processing device 80 further includes a cooling system 118 such as a fan, Peltier cell, cooling enclosure (such as a spray cooling system) and/or other cooling system that is powered via the power system 114 and that provides cooling to the processing module 110.

Figure 8:
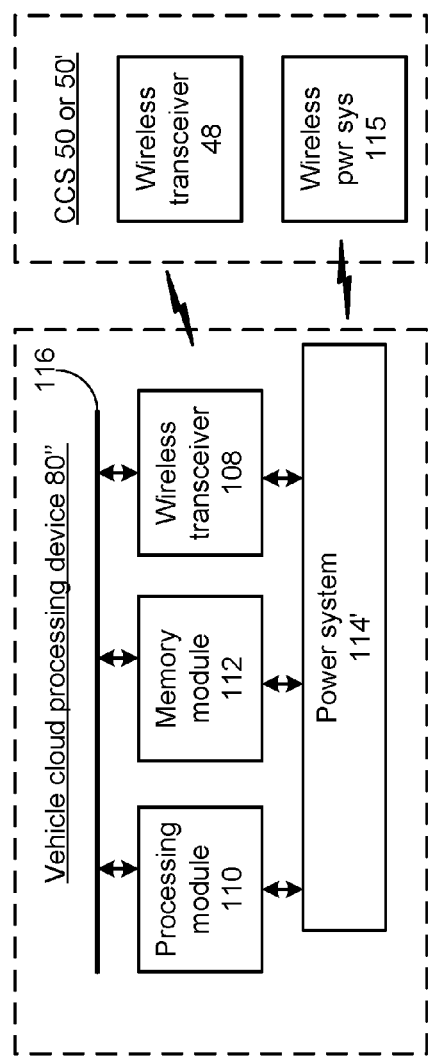
FIG. 8 presents a block diagram representation of vehicle cloud processing device 80" in accordance with a further embodiment of the present invention.

FIG. 8 presents a block diagram representation of vehicle cloud processing device 80" in accordance with a further embodiment of the present invention. In particular, an embodiment is shown where the vehicle cloud processing device 80" operates in a similar fashion to vehicle cloud processing devices 80 or 80', and includes similar elements that are referred to by similar reference numerals. In this embodiment, the power system 114' includes a battery, capacitor or other charge storage element and operates in a similar fashion to power system 114 but that also harvests electromagnetic energy from a wireless power system 115 at the vehicle aggregation location to power the vehicle cloud processing device 80".

Figure 9:
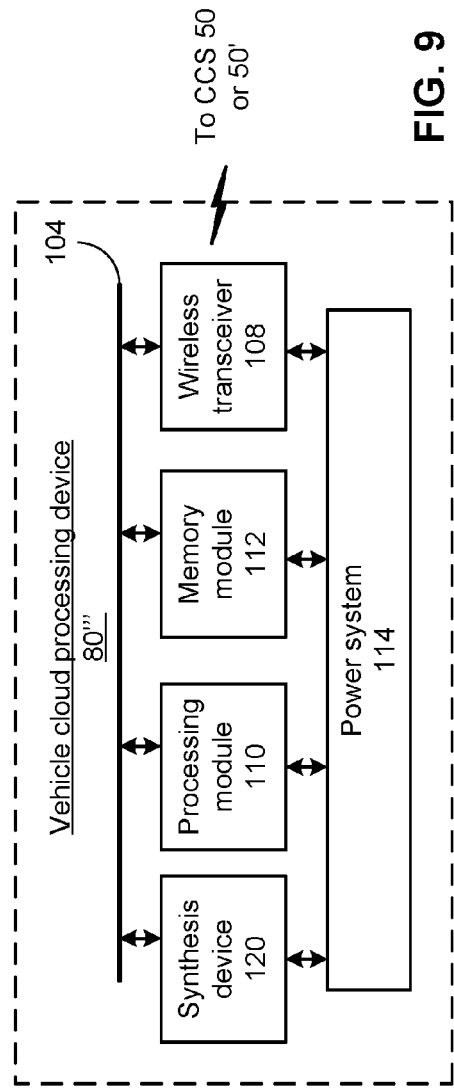
FIG. 9 presents a block diagram representation of vehicle cloud processing device 80'" in accordance with a further embodiment of the present invention.

FIG. 9 presents a block diagram representation of vehicle cloud processing device 80''' in accordance with a further embodiment of the present invention. In particular, an embodiment is shown where the vehicle cloud processing device 80" operates in a similar fashion to vehicle cloud processing devices 80, 80' or 80", and includes similar elements that are referred to by similar reference numerals. In this embodiment, the requests for the cloud computing services can include a request to synthesize a plurality of components, objects, articles or other tangible result at the vehicle. The vehicle cloud processing device 80''' includes a synthesis device 120 (including necessary materials or resources, or supplies) for synthesizing one or more components, objects, articles under the control of the network control device 47 and commands to synthesize the components, objects, articles. As previously discussed, the vehicle cloud processing device 80 sends data to the network control device 47 that indicates that the allotted task has been completed and further could also include information for facilitating the delivery of the synthesized output and or payment.

The synthesis device 120 can be a printer, a three-dimensional fabrication device, a bio-sequencing device, biosynthesis device, bioinformatics device or other device that either synthesize the components, objects, articles or provides some other physical result or transformation. Depending upon the request from a client device, the synthesis devices 120 associated with a large number of vehicle processing devices at one or more vehicle aggregation locations are capable of or making multiple copies of (or mass producing) one or more components, objects, or articles via mechanical fabrication or biosynthesis. For example, the cloud computing system 50 or 50' could fabricate all of the components of product for later assembly, fabricate all of the components for a kit or toy or prototype, synthesize biochips or sensors with all of the required biological probes, synthesize drug targets, new experimental drugs, generic drugs, or vaccines. It should be noted that the synthesis device 120 can optionally include cooling or storage system for biological materials either for supplies and or outputs.

Figure 10:
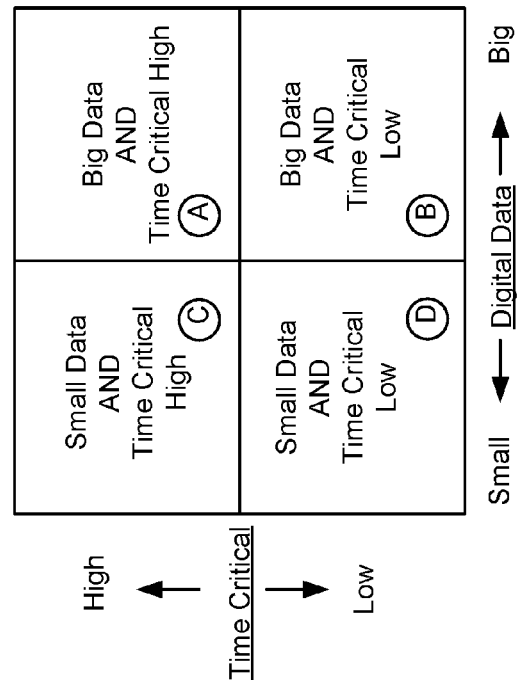
FIG. 10 presents a matrix representation of segmentation decisions in accordance with an embodiment of the present invention.

FIG. 10 presents a matrix representation of segmentation decisions in accordance with an embodiment of the present invention. As discussed in conjunction with FIG. 1, the network control device 47 receives requests for cloud computing services, segments these requests into discrete computational tasks and allocates these tasks to be performed by the various vehicle cloud processing devices 80. The network control device 47 also monitors the performance of these tasks by the vehicle cloud processing devices 80, collects the results and provides the completed services back to the requesting client device 30 via the IP network 40.

In an embodiment of the present invention, the requests for cloud computing services can include a corresponding time constraint as to how long the request should take to fulfill and/or a date that the results are needed by in addition to a data constraint that indicates an amount of data to be processed. The network control device 47 generates a segmentation of the requests for at least one cloud computing service into a plurality of computational tasks, based on a corresponding time and data constraints and facilitates the at least one cloud computing service by allocating the plurality of computational tasks to selected ones of the plurality of vehicle cloud processing devices based on the time and data constraints, system parameters of the vehicle cloud processing devices 80 and/or registry data associated with the various vehicle aggregation locations, etc.

FIG. 10 illustrates how one or more computation tasks from a client device 30 can be allocated based upon the digital data constraints of the computation task (i.e., small and big) and the time critical constraints of the computation task (i.e., low and high) into four quadrants representing: (A) Big Data AND Time Critical High Computation Tasks; (B) Big Data AND Time Critical Low Computation Tasks; (C) Small Data AND Time Critical High Computation Tasks; and (D) Small Data AND Time Critical Low Computation Tasks.

Figure 11:
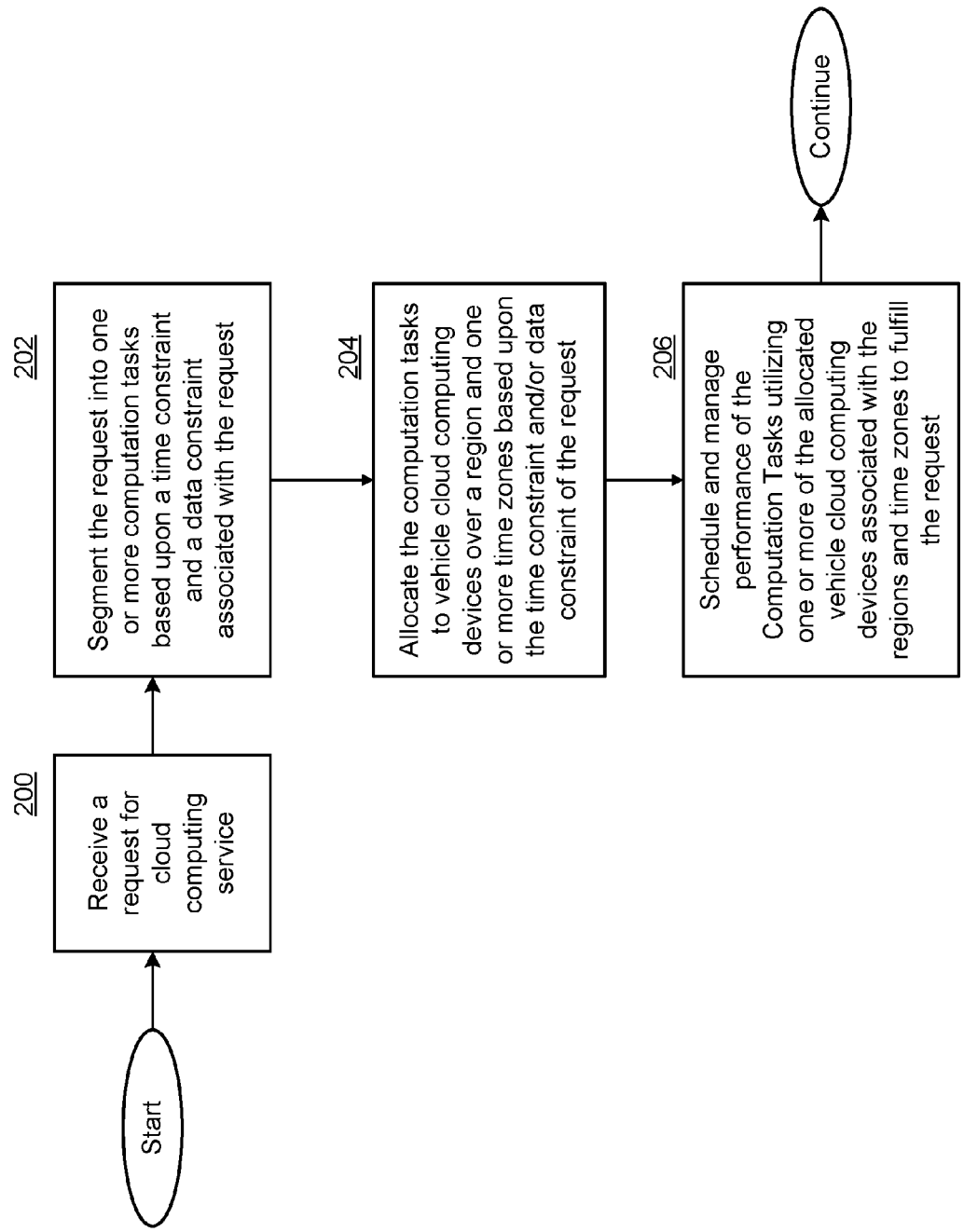
FIG. 11 presents a flow diagram representation of a method in accordance with an embodiment of the present invention.

FIG. 11 presents a flow diagram representation of a method in accordance with an embodiment of the present invention. In particular a method is presented for use in conjunction with one or more functions and features described in conjunction with FIGS. 1-10. In step 200 a request for cloud computing services is received. In step 202, the request is segmented into one or more computation tasks based upon a time constraint and a data constraint associated with the request. In step 204, the computation tasks are allocated to vehicle cloud computing devices over a region and one or more time zones based upon the time constraint and/or data constraint of the computation task. In step 206, the performance of the computation tasks of the vehicle cloud computing devices in the region and time zones is scheduled and managed to fulfill the request. These steps can be performed by network control device 47 or via other processing elements of cloud computing system, such as cloud computing system 50 or 50'

Figure 13:
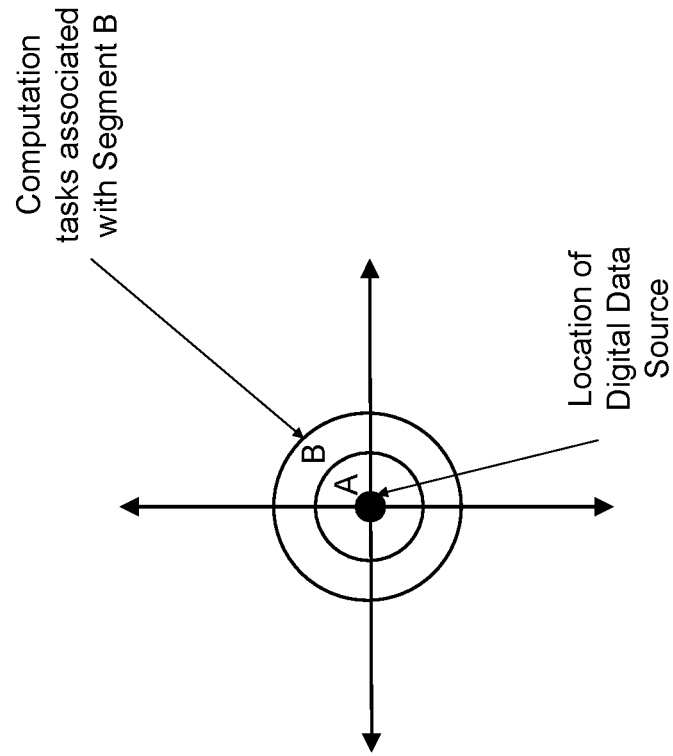
FIGS. 12-15 present graphical representations of segmentation decisions in accordance with an embodiment of the present invention.
Figure 12:
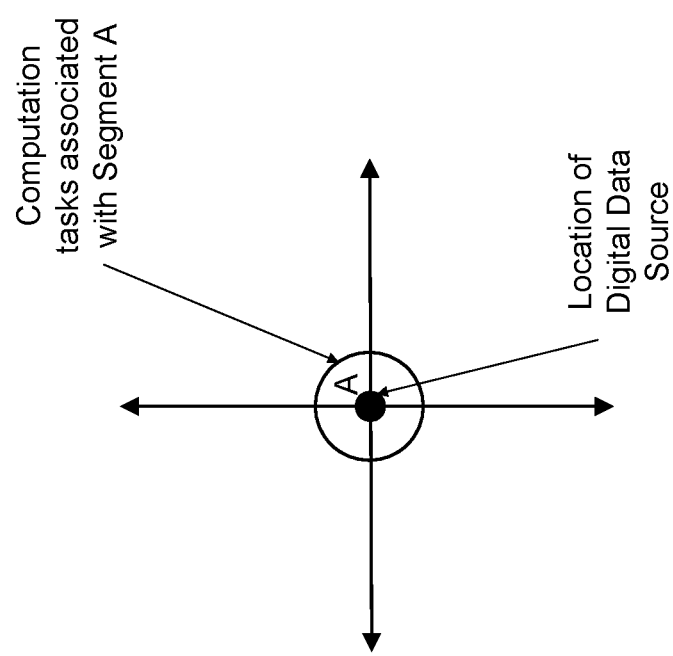
Figure 15:
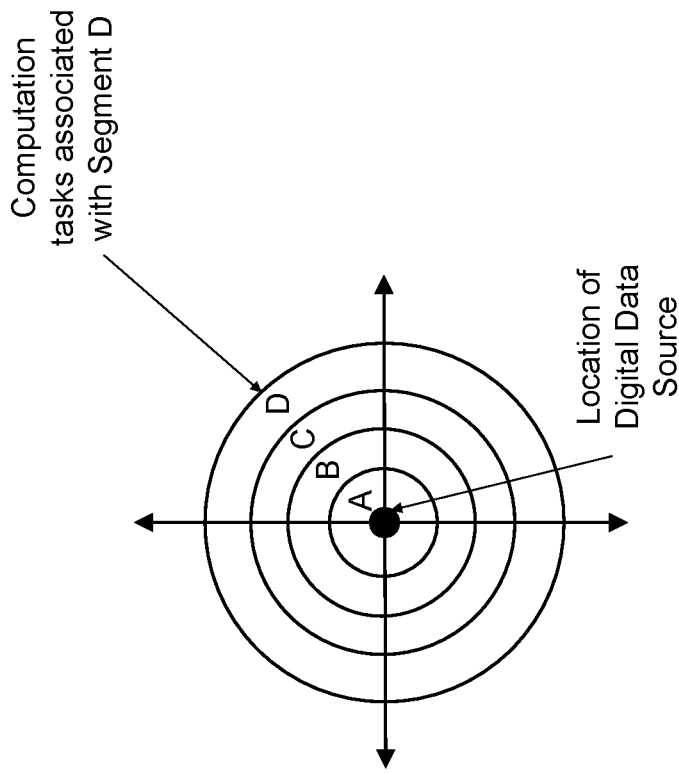
Figure 14:
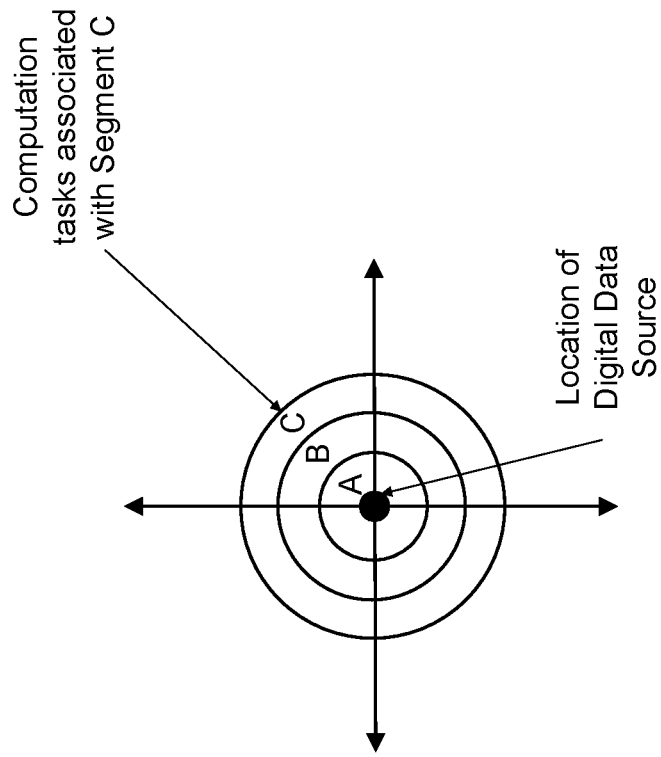

FIGS. 12-15 present graphical representations of segmentation decisions in accordance with an embodiment of the present invention. FIGS. 12-15 illustrate the location of a digital data source initiating a request for cloud computing services at the origin of the graph. In FIG. 12, the computation tasks associated with the request are allocated in regions/time zones closest to the digital data source when the request includes Big Data and High Time Critical constraints (segment A). In FIG. 13, the computation tasks associated with the request are allocated in a larger area of regions/time zones closest to the digital data source when the request includes Big Data and Low Time Critical constraints (segment B). In FIG. 14, the computation tasks associated with the request are allocated in an even larger area of regions/time zones closest to the digital data source when the request includes Small Data and High Time Critical constraints (segment C). In FIG. 15, the computation tasks associated with the request are allocated in the entire area of regions/time zones when the request includes Small Data and Low Time Critical constraints (segment D).

It should be noted that the regions are shown as circular in FIGS. 12-15 for illustration purposes only and that actual geographical regions and time zones may be of different shapes and sizes depending on the speed of communication links, the density of vehicle aggregation locations, etc. It should also be noted that the segmentation and allocation processes illustrated in conjunction with FIGS. 10-15 can be implemented in conjunction with other decision rules that take into consideration the availability of current resources in the cloud computing environment, the stage of processing of current requests, the other requests for cloud computing services in the queue, and/or the pricing of requested cloud computing services including optional premium pricing for faster service, etc.

Figure 16:
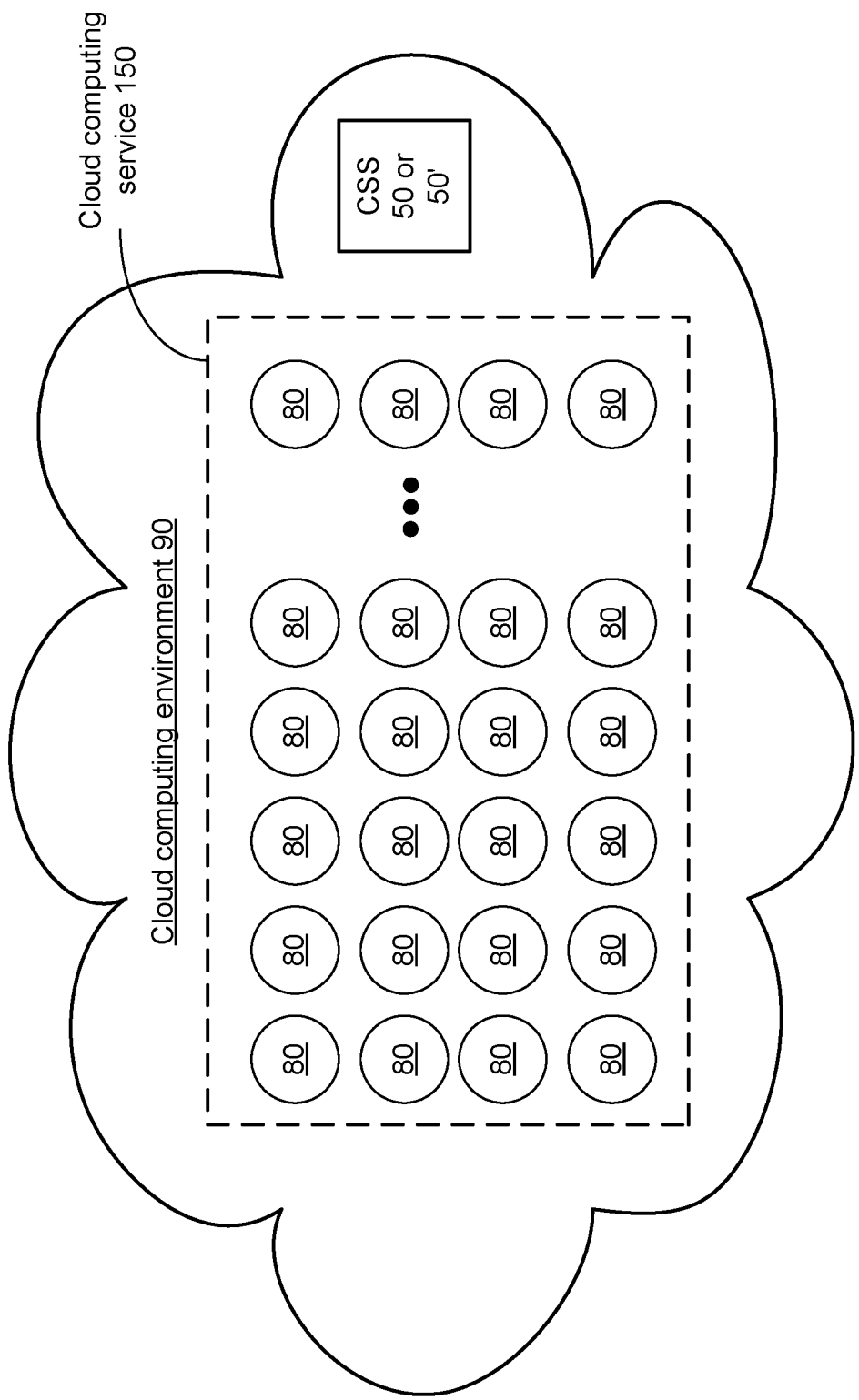
FIG. 16 presents a block diagram representation of a cloud computing environment 90 in accordance with an embodiment of the present invention.

FIG. 16 presents a block diagram representation of a cloud computing environment 90 in accordance with an embodiment of the present invention. As discussed in conjunction with FIG. 1, the network control device 47 of cloud computing system 50 or 50' receives a request for cloud computing services, segments this request into discrete computational tasks and allocates these tasks to be performed by the various vehicle cloud processing devices 80. The network control device 47 also monitors the performance of these tasks by the vehicle cloud processing devices 80, collects the results and provides the completed services back to the requesting client device 30 via the IP network 40. In particular, a cloud computing environment 90 is shown that performs a cloud computing service 150 via the operation of cloud computing system 50 or 50' operating in conjunction with a plurality of vehicle cloud processing devices 80. It should be noted that the cloud computing service 150 can be performed by a small number of vehicle cloud processing devices 80 such as a dozen or less, by a larger number of vehicle cloud processing devices 80 or by a very large number such as tens of thousands of such devices or more.

Figure 17:
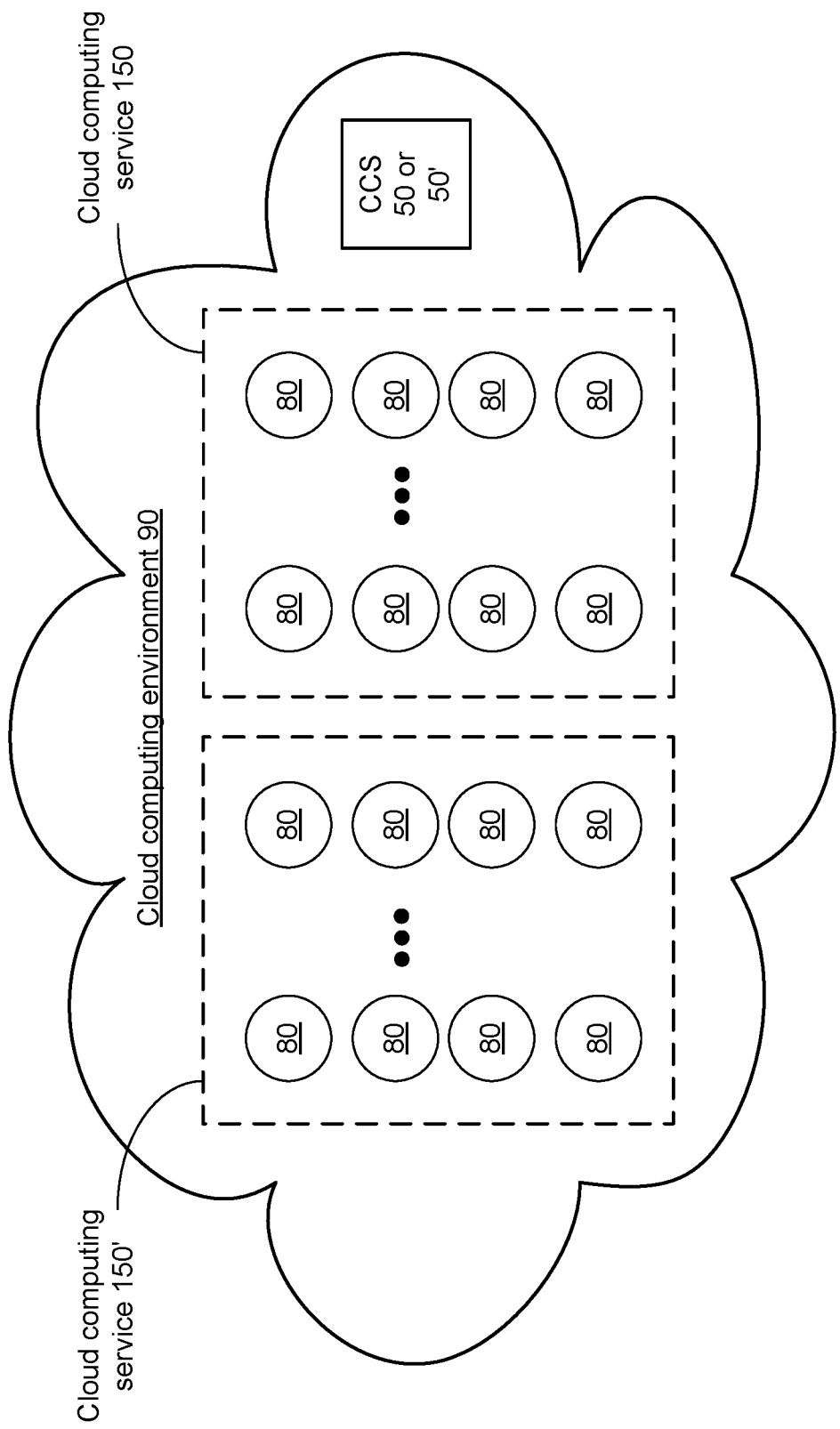
FIG. 17 presents a block diagram representation of a cloud computing environment 90 in accordance with an embodiment of the present invention.

FIG. 17 presents a block diagram representation of a cloud computing environment 90 in accordance with an embodiment of the present invention. In particular, a cloud computing environment 90 is shown that includes common elements from FIG. 16 that are referred to by common reference numerals. In this embodiment, the cloud computing system 50 or 50' has allocated a first group of vehicle cloud processing devices 80 to perform a cloud computing service 150 and a second group of vehicle cloud processing devices 80 to contemporaneously perform a cloud computing service 150'.

Figure 18:
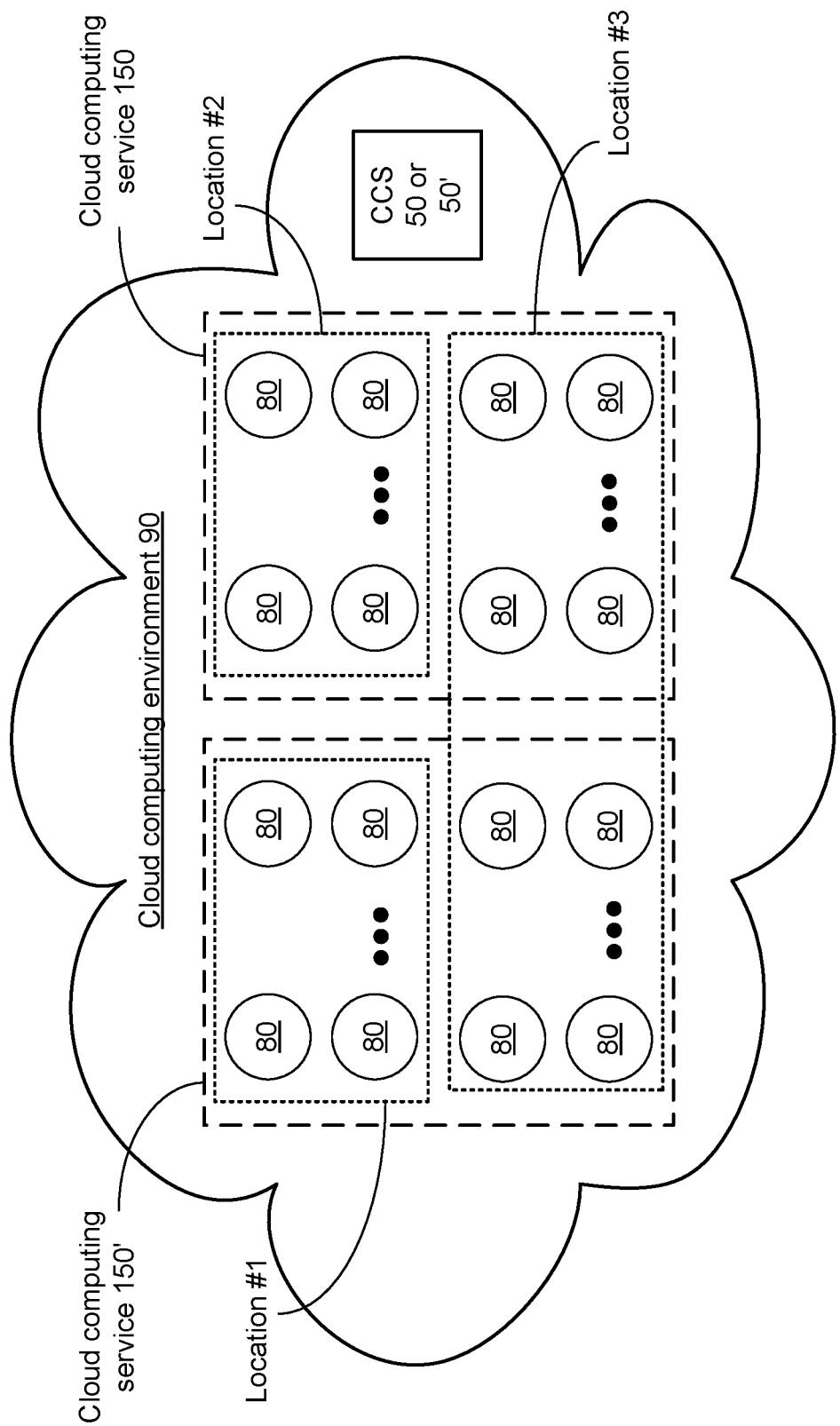
FIG. 18 presents a block diagram representation of a cloud computing environment 90 in accordance with an embodiment of the present invention.

FIG. 18 presents a block diagram representation of a cloud computing environment 90 in accordance with an embodiment of the present invention. In particular, a cloud computing environment 90 is shown includes common elements from FIG. 16 that are referred to by common reference numerals. In this embodiment, the cloud computing system 50 or 50' has allocated a first group of vehicle cloud processing devices 80 at location #1 and location #3 to perform a cloud computing service 150' and a second group of vehicle cloud processing devices 80 at location #2 and location #3 to perform a cloud computing service 150. As previously discussed, these different locations could be in the same region, different regions, the same or different time zones, etc. Further, fulfillment of a particular cloud computing service 150 may begin with tasks allocated to vehicle cloud processing devices 80 in location #2 and continue at some later time with additional tasks allocated to vehicle cloud processing devices 80 in location #3. In the alternative, fulfillment of a particular cloud computing service 150 can include tasks allocated to vehicle cloud processing devices 80 in location #2 and with additional tasks contemporaneously allocated to vehicle cloud processing devices 80 in location #3. In a further example, fulfillment of a particular cloud computing service 150 can include tasks allocated to vehicle cloud processing devices 80 in location #2 and with the same tasks contemporaneously allocated to vehicle cloud processing devices 80 in location #3 for the purpose of either fault tolerance or redundancy.

While two cloud computing services 150 and 150' and three locations #1, #2 and #3 are specifically illustrated, a larger number of cloud computing services and a larger number of locations can be implemented.

Figure 19:
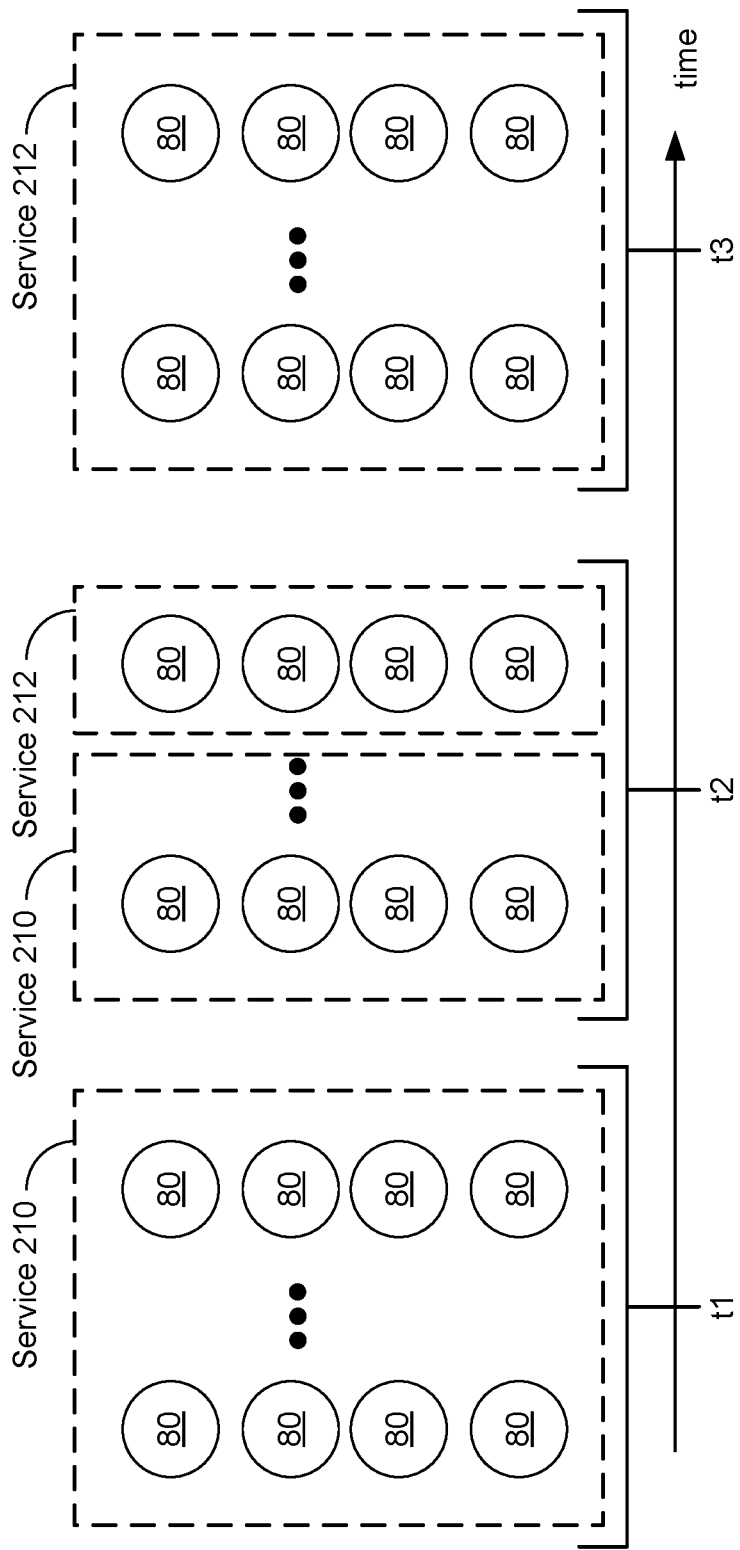
FIG. 19 presents a temporal diagram representation of service evolution in accordance with an embodiment of the present invention.

FIG. 19 presents a temporal diagram representation of service evolution in accordance with an embodiment of the present invention. As shown at time t1, a group of vehicle cloud processing devices 80 have been allocated tasks to perform to fulfill a particular service 210. At a subsequent time t2, some of the vehicle cloud processing devices 80 are still working on tasks associated with the service 210, but others in the group have completed their tasks associated with service 210 and have been allocated tasks from a new request for service 212. At a still later time t3, the vehicle cloud processing devices 80 are now working on tasks associated with the service 212. While two cloud computing services 210 and 212 are specifically illustrated, a larger number of cloud computing services could likewise be implemented contemporaneously, based on the number of vehicle cloud processing devices 80 available.

FIG. 20 presents a flowchart representation of a method in accordance with an embodiment of the present invention. In particular, a method is presented for use in conjunction with one or more functions and features described in conjunction FIGS. 1-19. In step 400, a network interface device is used to interface with a wide area network. In step 402, a wireless transceiver is used to engage in bidirectional communication with a plurality of vehicle cloud processing devices within a corresponding plurality of vehicles in at least one vehicle aggregation location. In step 404, requests for at least one cloud computing service are received via the wide area network. In step 406, the at least one cloud computing service is facilitated via the bidirectional communication with the plurality of vehicle cloud processing devices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, graphics processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprising:
communicating via a wide area network with a plurality of cloud processing devices aggregated at one or more vehicle aggregation locations each having a corresponding type, wherein the plurality of cloud processing devices aggregated at the one or more vehicle aggregation locations include a plurality of synthesis devices in a plurality of vehicles aggregated at the one or more vehicle aggregation locations;
receiving requests for cloud tasks via the wide area network from client devices, each request indicating an object or article to be synthesized;
allocating each request to the plurality of cloud processing devices aggregated at the one or more vehicle aggregation locations, wherein the plurality of cloud processing devices aggregated at the one or more vehicle aggregation locations synthesizes the object or article via at least one of the plurality of synthesis devices in at least one of the plurality of vehicles aggregated at the one or more vehicle aggregation locations, wherein each of the plurality of synthesis devices includes a biosynthesis device, bio-sequencing device, bioinformatics device or three-dimensional printer that produces the object or article in a corresponding one of the plurality of vehicles, wherein each cloud task is allocated to the plurality of cloud processing devices aggregated at the one or more vehicle aggregation locations based on an estimated time that at least one of the plurality of vehicles will be parked at the one or more vehicle aggregation locations in conjunction with a time constraint associated with the cloud task that indicates a length of time to fulfill the cloud task, and wherein the estimated time that at least one of the plurality of vehicles will be parked at the one or more vehicle aggregation locations is generated based on a model corresponding to the type of the one or more vehicle aggregation locations, wherein the plurality of cloud processing devices aggregated at the one or more vehicle aggregation locations fulfill the cloud task by synthesizing the object or article; and
receiving cloud task results data via the wide area network from the plurality of cloud processing devices aggregated at the one or more vehicle aggregation locations indicating when the cloud tasks are fulfilled.

2. The method of claim 1 wherein allocating each request to the plurality of cloud processing devices aggregated at the one or more vehicle aggregation locations includes providing operational instructions to be executed by the synthesis device.

3. The method of claim 1 wherein allocating each request to the plurality of cloud processing devices aggregated at the one or more vehicle aggregation locations includes providing the time constraint associated with the cloud task, based on capabilities associated with the plurality of cloud processing devices aggregated at the one or more vehicle aggregation locations.

4. The method of claim 1 wherein allocating each request to the plurality of cloud processing devices aggregated at the one or more vehicle aggregation locations is based on capabilities associated with the plurality of cloud processing devices.

5. The method of claim 1 wherein allocating each request to the plurality of cloud processing devices aggregated at the one or more vehicle aggregation locations is based on a task duration.

6. The method of claim 1 further comprising:
monitoring the performance of the cloud tasks by the plurality of cloud processing devices aggregated at the one or more vehicle aggregation locations; and
providing feedback to corresponding client devices of completed cloud tasks.

7. The method of claim 1 wherein the object or the article is a three-dimensional object or a three-dimensional article.

8. The method of claim 1 wherein the object or article includes at least one of a product, a drug, a vaccine, a cosmetic, a toy, a kit, a prototype, or a sensor.

9. The method of claim 1 wherein the plurality of cloud processing devices aggregated at the one or more vehicle aggregation locations synthesizes a plurality of components of the object or article for assembly.

10. The method of claim 1 wherein the one or more vehicle aggregation locations are in a plurality of time zones.

11. The method of claim 1 further comprising:
facilitating at least one of: delivery of the object or article or payment for the object or article.

12. The method of claim 1 wherein the client devices include at least one of: a smartphone, mobile data device, tablet computing system, digital book, camera, game device, internet television, set top box, or a digital video recorder.

13. A method comprising:
communicating via a wide area network with a plurality of cloud processing devices aggregated at one or more vehicle aggregation locations each having a corresponding type, wherein the plurality of cloud processing devices aggregated at the one or more vehicle aggregation locations include a plurality of three-dimensional printers in a plurality of vehicles aggregated at the one or more vehicle aggregation locations;
receiving requests for cloud tasks via the wide area network from client devices, each request indicating an object or article to be synthesized;
allocating each request to the plurality of cloud processing devices aggregated at the one or more vehicle aggregation locations, wherein the plurality of cloud processing devices aggregated at the one or more vehicle aggregation locations synthesizes the object or article via at least one of the plurality of three-dimensional printers in at least one of the plurality of vehicles aggregated at the one or more vehicle aggregation locations, wherein each cloud task is allocated to the plurality of cloud processing devices aggregated at the one or more vehicle aggregation locations based on an estimated time that at least one of the plurality of vehicles will be parked at the one or more vehicle aggregation locations in conjunction with a time constraint associated with the cloud task that indicates a length of time to fulfill the cloud task, and wherein the estimated time that at least one of the plurality of vehicles will be parked at the one or more vehicle aggregation locations is generated based on a model corresponding to the type of the one or more vehicle aggregation locations; and
receiving cloud task results data via the wide area network from the plurality of cloud processing devices aggregated at the one or more vehicle aggregation locations indicating when the cloud tasks are fulfilled.

14. The method of claim 13 wherein allocating each request to the plurality of cloud processing devices aggregated at the one or more vehicle aggregation locations includes providing the time constraint associated with the cloud task, based on capabilities associated with the plurality of cloud processing devices aggregated at the one or more vehicle aggregation locations.

15. The method of claim 13 wherein allocating each request to the plurality of cloud processing devices aggregated at the one or more vehicle aggregation locations is further based on a task duration.

16. The method of claim 13 further comprising:
monitoring performance of the cloud tasks by the plurality of cloud processing devices aggregated at the one or more vehicle aggregation locations; and
facilitating at least one of: delivery of the object or article or payment for the object or article.

17. The method of claim 13 wherein the object or the article is a three-dimensional object or a three-dimensional article.

18. The method of claim 13 wherein the object or article includes at least one of a product, a drug, a cosmetic, a toy, a kit, a prototype, or a sensor.

19. The method of claim 13 wherein the plurality of cloud processing devices aggregated at the one or more vehicle aggregation locations synthesizes a plurality of components of the object or article for assembly.

20. The method of claim 13 wherein the one or more vehicle aggregation locations are in a plurality of time zones.

* * * * *